United States Patent
Silverman et al.

(10) Patent No.: US 7,676,590 B2
(45) Date of Patent: Mar. 9, 2010

(54) BACKGROUND TRANSCODING

(75) Inventors: Andrew L. Silverman, Redmond, WA (US); Madhuvan Gupta, Redmond, WA (US); Kipley J. Olson, Mercer Island, WA (US); Myron C. Thomas, Newcastle, WA (US)

(73) Assignee: Microsoft Corporation, Redmond, WA (US)

( * ) Notice: Subject to any disclaimer, the term of this patent is extended or adjusted under 35 U.S.C. 154(b) by 1079 days.

(21) Appl. No.: 10/838,486

(22) Filed: May 3, 2004

(65) Prior Publication Data

US 2005/0246451 A1    Nov. 3, 2005

(51) Int. Cl.
*G06F 15/16* (2006.01)
(52) U.S. Cl. .......................... 709/231; 709/203; 725/62; 725/98; 725/99; 725/100; 725/101; 725/91; 725/153; 725/143; 725/104
(58) Field of Classification Search .................... 725/62, 725/91, 87, 105, 98–101, 153, 143, 104; 709/231, 203
See application file for complete search history.

(56) References Cited

U.S. PATENT DOCUMENTS

| 5,893,920 | A | 4/1999 | Shaheen et al. |
| 5,987,126 | A | 11/1999 | Okuyama et al. |
| 6,052,735 | A | 4/2000 | Ulrich et al. |
| 6,189,146 | B1 | 2/2001 | Misra et al. |
| 6,219,652 | B1 | 4/2001 | Carter et al. |
| 6,324,544 | B1 | 11/2001 | Alam et al. |
| 6,327,652 | B1 | 12/2001 | England et al. |
| 6,393,434 | B1 | 5/2002 | Huang et al. |
| 6,407,680 | B1 | 6/2002 | Lai et al. |
| 6,463,445 | B1 | 10/2002 | Suzuki et al. |
| 6,493,758 | B1 | 12/2002 | McLain |
| 6,542,546 | B1 | 4/2003 | Vetro et al. |
| 6,611,358 | B1 | 8/2003 | Narayanaswamy |
| 6,757,517 | B2 * | 6/2004 | Chang ........................ 455/3.05 |
| 6,772,340 | B1 | 8/2004 | Peinado et al. |
| 6,775,655 | B1 | 8/2004 | Peinado et al. |

(Continued)

FOREIGN PATENT DOCUMENTS

WO    WO02/28006    4/2002

(Continued)

OTHER PUBLICATIONS

Digital 5, "Media Server," printed Apr. 18, 2005, 2 pages.

(Continued)

*Primary Examiner*—Nathan Flynn
*Assistant Examiner*—Mohammad A Siddiqi
(74) *Attorney, Agent, or Firm*—Lee & Hayes, PLLC

(57) ABSTRACT

A system and methods are described for transcoding media content in the background on a source computer device prior to such time as a target media playback device is connected to the source computer for synchronization of the media content. The system and methods anticipate which media content to background-transcode based on user input rules and media status data that are maintained in a transcode database. Pre-transcoding media content provides advantages that include a significant reduction in the time needed to synchronize media content between a source computer and a target media playback device, and an efficient use of CPU power for transcoding media content at times when the CPU might otherwise stand idle.

29 Claims, 8 Drawing Sheets

U.S. PATENT DOCUMENTS

| | | | |
|---|---|---|---|
| 6,959,348 B1 | 10/2005 | Chan et al. | |
| 6,981,045 B1 | 12/2005 | Brooks | |
| 6,983,371 B1 | 1/2006 | Hurtado et al. | |
| 7,039,643 B2 | 5/2006 | Sena et al. | |
| 7,054,335 B2 | 5/2006 | Wee et al. | |
| 7,054,964 B2 | 5/2006 | Chan et al. | |
| 7,089,309 B2 | 8/2006 | Ramaley et al. | |
| 7,111,058 B1 | 9/2006 | Nguyen et al. | |
| 7,120,873 B2 * | 10/2006 | Li | 715/723 |
| 7,133,925 B2 | 11/2006 | Mukherjee et al. | |
| 7,143,354 B2 * | 11/2006 | Li et al. | 715/725 |
| 7,155,475 B2 * | 12/2006 | Agnoli et al. | 709/201 |
| 7,200,680 B2 | 4/2007 | Evans et al. | |
| 7,203,620 B2 * | 4/2007 | Li | 702/181 |
| 7,278,165 B2 | 10/2007 | Molaro | |
| 7,290,699 B2 | 11/2007 | Reddy et al. | |
| 7,382,879 B1 | 6/2008 | Miller | |
| 7,421,024 B2 | 9/2008 | Castillo | |
| 7,433,546 B2 * | 10/2008 | Marriott et al. | 382/305 |
| 7,474,106 B2 | 1/2009 | Kanno | |
| 7,475,106 B2 | 1/2009 | Agnoli et al. | |
| 2001/0033619 A1 | 10/2001 | Hanamura et al. | |
| 2002/0078075 A1 * | 6/2002 | Colson et al. | 707/204 |
| 2003/0028488 A1 | 2/2003 | Mohammed et al. | |
| 2003/0028643 A1 | 2/2003 | Jabri | |
| 2003/0126608 A1 | 7/2003 | Safadi et al. | |
| 2004/0193648 A1 | 9/2004 | Lai et al. | |
| 2004/0196975 A1 | 10/2004 | Zhu et al. | |
| 2005/0239434 A1 | 10/2005 | Marlowe | |
| 2006/0008256 A1 * | 1/2006 | Khedouri et al. | 386/124 |
| 2007/0058718 A1 | 3/2007 | Shen et al. | |
| 2007/0153910 A1 | 7/2007 | Levett | |

FOREIGN PATENT DOCUMENTS

| | | |
|---|---|---|
| WO | WO03/034313 | 4/2003 |
| WO | WO03/058508 | 7/2003 |
| WO | WO2004/102459 | 11/2004 |

OTHER PUBLICATIONS

DRM Watch Staff, "Microsoft Extends Windows Media DRM to Non-Windows Devices," DRM Watch, May 7, 2004, 2 pages.

Ihde, Steven C. at al., "Intermediary-based Transcoding Framework," printed Apr. 18, 2005, pp. 1-3.

Kassler et al., "Generic QOS Aware Media Stream Transcoding and Adaptation," Dept. of Distributed Systems, University of Ulm, Germany, printed Apr. 18, 2005, 10 pages.

Lee, Yul-Wah et al., "Gamma: A Content-Adaptation Server for Wireless Multimedia Applications," Bell Laboratories, Holmdel, NJ USA, printed Apr. 18, 2005, pp. 1-36.

LightSurf Technologies, "LightSurf Intelligent Media Optimization and Transcoding," printed Apr. 18, 2005, 1 page.

Singh; "PTC: Proxies that Transcode and Cache in Heterogeneous Web Client Environments"; Proceedings of the Third International Conference on Web Information Systems, 2002; pp. 11-20.

Huang, et al.; "A Frame-Based MPEG Characteristics Extraction Tool and Its Application in Video Transcoding"; IEEE Transaction on Consumer Electronics, Aug. 2002; vol. 48, No. 3; pp. 522-532.

Britton; "Transcoding: Extending e-business to new environments"; IBM Systems Journal, 2001; vol. 40, No. 1; pp. 153-178.

Chen, et al.; "iMobile EE-an interprise mobile service platform"; Wireless Networks, 2003; vol. 9, No. 4; pp. 283-297.

Chandra, et al.; "Application-Level Differentiated Multimedia Web Services Using Quality Aware Transcoding"; IEEE Jorunal on Selected Areas of Communications, Dec. 2000; vol. 18, No. 12; pp. 2544-2564.

Lee, et al.; "Data Synchronization Protocol in Mobile Computing Environment UsingSyncML"; HSNMC 2002 5th IEEE International Conference on High Speed Networks and Multimedia Communications, 2002; pp. 133-137.

Nikkei Electronics; "Contents transcoding technology is now spotlighted as :lubricant" for online digital distribution; vol. 775, 2000; pp. 57-62.

"Transcode" Online Nov. 29, 2002 retrieved from the internet: url:http://www.theorie.physik.uni-goettingen.de/(ostreich/transcode/html/intro.html retrieved Aug. 19, 2004.

Bagwell Chris; "SoX—Sound eXchange" Internet Dec. 12, 2003 retrieved from url:http://web.archive.org/web/20031212170807/http://sox.sourceforge.net retrieved on Aug. 16, 2004.

Britton et al.; "Transcoding: Extending e-buisness to new environments" Internet Nov. 6, 2002 Retrieved from URL:http://researchweb.watson.ibm.com/journal/sj/401/britton.html retrieved Aug. 19, 2004.

Chi-Hung Chi Yang Cao; pervasive WEb Content Delivery with Efficient Data Reuse Internet Aug. 1, 2002 retrieved from url:http//2002.iwcw.org/papers/18500120.pdf retrieved on Aug. 16, 2004.

D. L. Ripps; "The Multitasking Mindset Meets the Operating System" EDN Electrical Design News Cahners Publishing Co. Newton Massachusetts vol. 35 No. 20 Oct. 1, 1990.

Shaha et al.; "Multimedia Content Adaptation for QoS Management over Heterogeneous Networks" Internet May 11, 2001 retrieved Aug. 18, 2004.

Shen et al.; "Caching Strategies in Transcoding-enabled Proxy Systems for Streaming Media Distribution Networks" Internet Dec. 10, 2003 Retrieved from URL:http://www.hpl.hp.com/techreports/2003/HPL-2003-261.pdf retrieved on Aug. 19, 2004.

Zhijun Lei and Nicolas D. Goer; "Context -based media Adaptation in Pervasive Computing" Internet May 31, 2001 Retrieved from url:http://www.mcrlab.uottawa.ca/papers/Ryan_paper.pdf retrieved on Aug. 19, 2004.

* cited by examiner

218 ↘

| Target Device A | Target Device B | Target Device C | Target Device D |
|---|---|---|---|
|  |  |  |  |
|  |  |  |  |
|  |  |  |  |
|  |  |  |  |

| Target Device A ||||| 
|---|---|---|---|---|
| Desired Media | Media In Media Library Yet? | Media On Target Device Yet? | Media Transcoded Yet? | Device Capabilities |
| Friends | ✓ | X | X | File Format(s), Bit Rate(s), Screen Resolution, |
| Cops | ✓ | X | X | |
| Simpsons | X | X | X | |
| • | • | • | • | • |
| • | • | • | • | • |

| Target Device A ||||| 
|---|---|---|---|---|
| Desired Media | Media In Media Library Yet? | Media On Target Device Yet? | Media Transcoded Yet? | Device Capabilities |
| Friends | ✓ | X | ✓ | File Format(s), Bit Rate(s), Screen Resolution, |
| Cops | ✓ | X | ✓ | |
| Simpsons | ✓ | X | ✓ | |
| • | • | • | • | • |
| • | • | • | • | • |

*Fig. 4*

BACKGROUND TRANSCODING

TECHNICAL FIELD

The present disclosure generally relates to synchronizing media content between a source device and a target playback device, and more particularly to pre-transcoding the media content prior to connecting the devices for the synchronizing.

BACKGROUND

As digital media technology continues to advance and the cost of storage continues to decline, users increasingly host and consume digital media on their own primary computers (e.g., desktop PCs). Examples of such digital media include music, video, still pictures, and so on.

In addition, a corresponding increase in the availability of portable media playback devices such as personal digital assistants (PDAs), hand-held computers, laptop computers, and smart phones is providing users more ubiquitous access to information than ever. As users rely more and more on such portable computing devices, there is a growing need for applications that effectively transfer digital media from source devices, such as primary computers, to the portable devices.

In the past, transcoding digital media for use on portable media playback devices has been done "on-the-fly", or at the time the media is being transferred from the source device (e.g., desktop PC). Transcoding typically includes altering a media file through one or more transcoding processes including, for example, converting a media file from one format to another (e.g., MP3 to WMA) so the file will play on the playback device, down-sampling the file to a lower bit rate to reduce the amount of storage space needed on the playback device, adapting the screen size of the file so video appears correctly on the playback device. One important reason for transcoding may be to convert a media file to a format having lower CPU requirements for decoding, since "desktop" content may be too complex to decode effectively on a device with a lower-powered processor, such as a portable media playback device. On-the-fly transcoding of digital media generally occurs during synchronization of media content between a source device such as a desktop PC and a target playback device, at the time the devices are connected together.

Although transcoding can be a time-consuming process, several factors have generally made the added time needed for on-the-fly transcoding during media transfers a reasonable inconvenience. For example, until recently, most portable media playback devices were audio-only devices supporting audio file formats such as MP3 and WMA. Transcoding (e.g., changing the bit rate and/or file format) a 3 minute song file while transferring it to a playback device adds only around 20 seconds to the transfer time. In addition, limited storage capability on a playback device limits the amount of media that can be transferred to the device, making the time required for transcoding less noticeable.

With portable media playback devices now able to hold gigabytes of content, however, in addition to more and more of these devices including video capability, the time required for transcoding media content while transferring it to a playback device can have a much greater adverse impact on the overall user experience. Transferring an increased amount of media content to fill a larger storage capacity on a newer device compounds the problem of the time-consuming transcode process noted above. In addition, transcoding video content for devices that provide video playback can be much more time intensive than transcoding audio content, which is primarily what has been transcoded for most media playback devices in the past. As an example, desktop video can consume disk space at rates in excess of 1 GB per hour, and the complexity of the video encoding process causes video transcoding to generally take between ½ and 2× "real time" to complete. Therefore, performing all file transcoding tasks at the actual time that media files are being transferred to a playback device may no longer be acceptable.

Accordingly, a need exists for a way to reduce the time required for transferring digital media content when synchronizing the content between a source device and a target media playback device.

SUMMARY

A system and methods are described for transcoding digital media content on a source computer in anticipation of the content being copied to one or more target media playback devices in a content synchronization process. The media content is typically fully transcoded in the background on the source computer before a target playback device is connected for the synchronization process.

The system provides a transcode architecture that includes a transcode control module, a transcode cache for storing transcoded media files, and a transcode database for storing media status information related to one or more target playback devices along with the playback capabilities of those devices. The media status information includes rules that a user has set up to indicate which media content on the source computer they wish to have copied to the one or more target playback devices. The rules in the transcode database may be entered through different applications on the source computer, such as a media player application.

The transcode control module monitors and updates the transcode database and pre-transcodes media content that is destined for synchronization to a target playback device. When new media arrives in a media library (e.g., from a media player application), the transcode control module determines if a target playback device desires that media. If so, the transcode control module transcodes the media content and stores it in the transcode cache in anticipation of a synchronization process in which the transcoded media will be copied to the target playback device.

Media status information in the transcode database is updated so that when the target playback device is connected to the source computer for synchronization, the transcode control module can quickly determine which media content is to be copied to the target device, and whether or not that media content has been transcoded and stored in the transcode cache. Assuming the media content has already been fully transcoded and stored in the transcode cache, the content can be immediately transferred to the target playback device with no delay in time. If the media content has not been transcoded yet, the transcode module prioritizes that content above other transcode tasks in order to transcode it as fast as possible and complete the current synchronization process.

BRIEF DESCRIPTION OF THE DRAWINGS

The same reference numerals are used throughout the drawings to reference like components and features.

FIGS. 3-5 illustrate exemplary tables in an exemplary transcode database.

FIG. 6 illustrates an exemplary media library and an exemplary table of an exemplary transcode database.

FIG. 7 illustrates an exemplary transcode timeline that shows a priority order of transcoding media files.

FIG. 8 illustrates an exemplary transcode timeline with an adjusted transcode priority.

DETAILED DESCRIPTION

Introduction

The following discussion is directed to a system and methods for transcoding media content in the background on a source computer device prior to such time as a target media playback device is connected to the source computer for synchronization of the media content. The system and methods anticipate which media content to background-transcode based on user input rules and media status data that are maintained in a transcode database. Pre-transcoding media content as discussed herein provides advantages that include a significant reduction in the time needed to synchronize media content between a source computer and a target media playback device. Another advantage is an efficient use of CPU power for transcoding media content at times when the CPU might otherwise stand idle.

Exemplary Background Transcoding Environment

Figure 1:
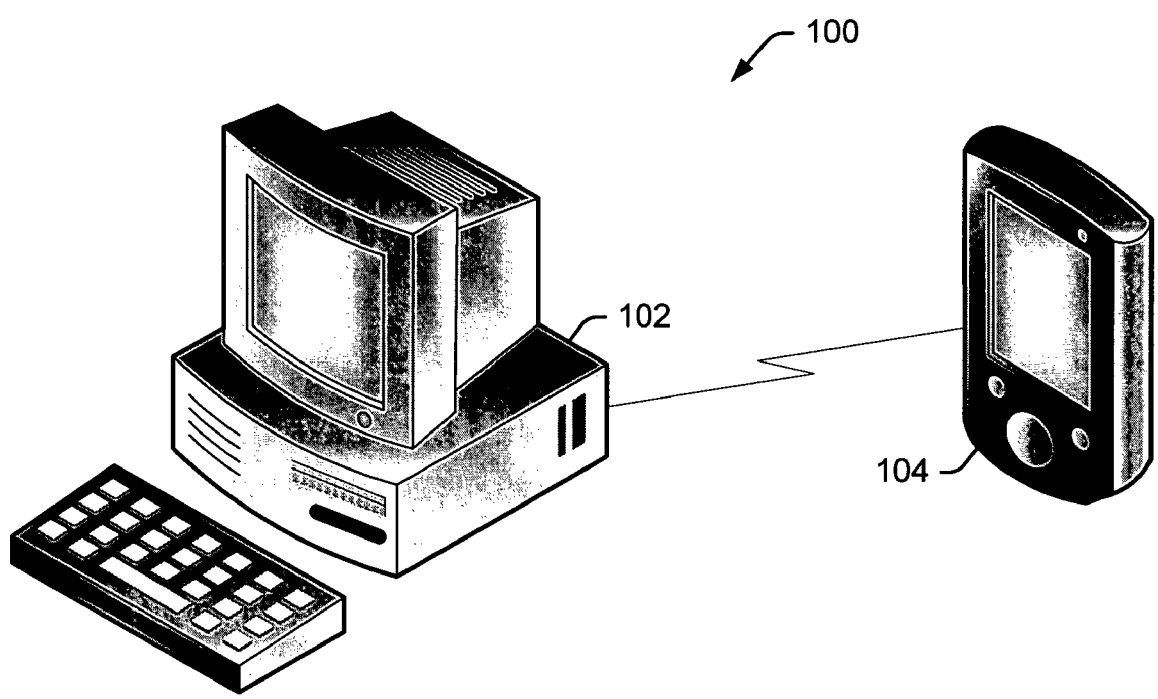
FIG. 1 illustrates an exemplary environment suitable for pre-transcoding media content on a source computing device in anticipation of transferring the media content to a subsequently coupled target media playback device.

FIG. 1 illustrates an exemplary environment 100 suitable for pre-transcoding media content on a source computing device 102 in anticipation of transferring the media content to a subsequently coupled target media playback device 104. The exemplary environment 100 generally illustrates a source-target media content synchronization scenario in which a target playback device 104 is coupled to a source device 102 for the purpose of transferring pre-transcoded media content to the target device. In a typical scenario, media content received by source device 102 and destined for synchronization with a target playback device 104 is fully transcoded prior to the time the target device 104 is connected to the source device. Thus, synchronizing media content between the source device 102 and target playback device 104 is uninhibited by the transcoding process, and the time for synchronizing the content is significantly reduced.

Figure 13:
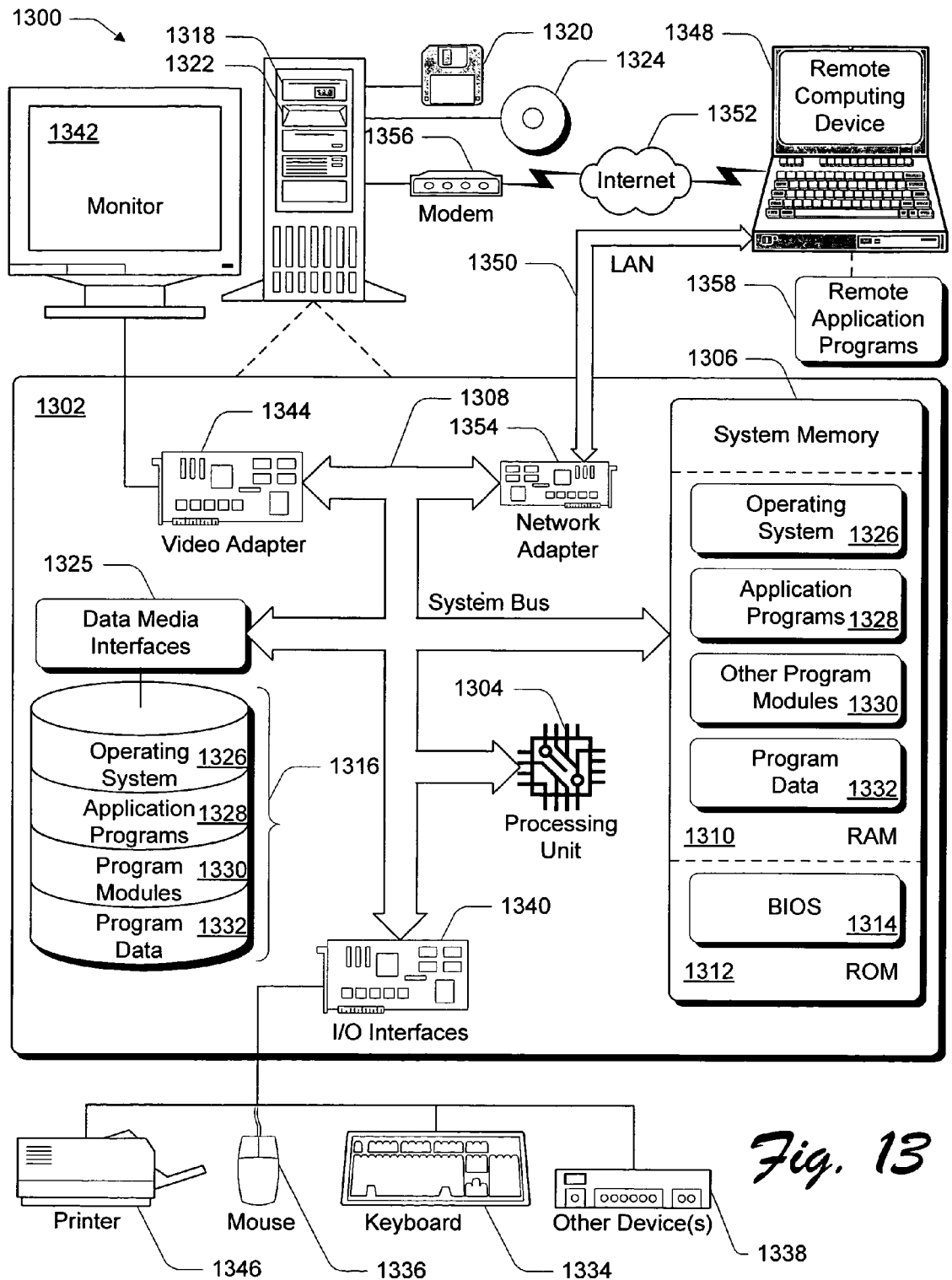
FIG. 13 illustrates an exemplary computing environment suitable for implementing computing devices such as those discussed with reference to FIGS. 1 through 12.

Source computing device 102 is typically implemented as a user's primary computing device, such as a desktop personal computer (PC). Source device 102 might also be implemented as other conventional computing devices generally configured to receive and render multi-media content from various sources, and/or to reformat such content for synchronization and playback on a target playback device 104. An example of a source computing device 102 is depicted in FIG. 13 and described in greater detail below in the Exemplary Computing Environment section.

Target media playback device 104 may be implemented as any one of numerous digital media player devices available from various manufacturers. Such devices are typically configured to store and play back audio data in the form of variously formatted music files such as MP3 (MPEG-1 Audio Layer 3) files and WMA (Windows Media Audio) files. A lesser, but growing, number of such devices are also configured to store and play back video data in the form of variously formatted video files such as MPEG-4 files and WMV (Windows Media video) files. Therefore, examples of a target media playback device 104 may include various general-purpose laptop and notebook computers configured to playback media content, in addition to devices that are more specifically designed to play back various forms of multimedia, such as Rio's Rio Riot and Rio Karma, Archos' Jukebox Recorder 20 and AV320 Pocket Audio/Video Recorder, Creative's Jukebox Zen and Portable Media Center Zen, Apple's ipod, ZVUE's MP4 Video Player, and so on.

Exemplary Background Transcoding Embodiments

Figure 2:
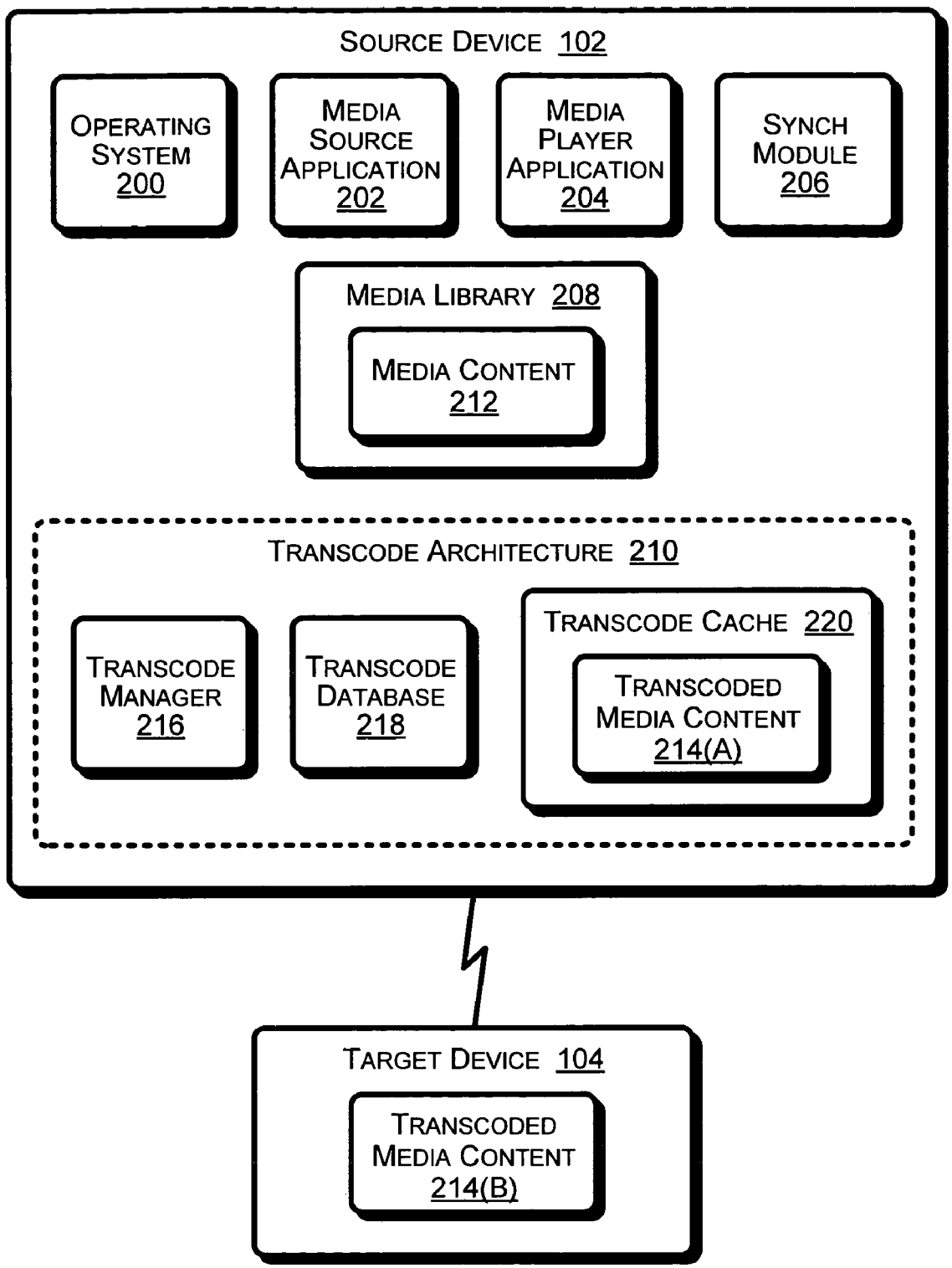
FIG. 2 illustrates a block diagram representation of an exemplary source device that is suitable for background transcoding of media content destined for copying to a target playback device.

FIG. 2 illustrates a block diagram representation of an exemplary source device 102 that is suitable for background transcoding of media content destined for copying to a target playback device 104. Various components on source device 102 facilitate the retrieval and management of media content for the general purpose of rendering the content on source device 102 and/or synchronizing the content with a target playback device 104. These components include an operating system 200, one or more media source applications 202, a media player application 204, a media content synchronization program module 206, a media library, and a transcode architecture 110 embodied on one or more processor-readable media (see FIG. 13 and Exemplary Computing Environment section below). Although these components are illustrated separately on source device 102, it is noted that any one or more of these components may be implemented on source device 102 as part of multimedia software product, the operating system 200, or as stand-alone components.

A media source application 202 may be one or more of various applications and/or tools configured to receive media content. For example, media source application 202 may be an interactive TV service application that facilitates the recording of video (e.g., TV programming) directly off of a cable and/or satellite feed, a video capture component to transfer home video footage from a digital video recorder onto source device 102, a Web browser application that facilitates downloading media off the Internet, and so on. Such media source applications 202 typically supply various forms of media content 212 to a media library 208 on source device 102. Thus, media content 212 stored in media library 208 may include, for example, audio files in the form of MP3 and WMA files, video files in the form of DVR-MS, AVI and MOV files, and image files in the form of GIF and JPEG files.

A media source application 202 may also include or be part of a media player application 204. A media player application 204 is typically a desktop based application player that manages a broad range of multimedia related tasks. For example, a media player application 204 may handle streaming audio and video, CD/DVD playback, MP3 and WMA support, encoding, CD/DVD burning, Internet radio, and the like. A media player application 204 may also offer Web browser integration so it can be embedded in a browser enabling multi-tasking during streaming video. Like other media source applications 202, a media player application 204 may supply various forms of media content 212 (e.g., audio files, video files, image files, etc.) to a media library 208 on source device 102.

As part of a media player application 204, the operating system 200, or as a stand-alone component, synch module 206 provides a user-configurable model for facilitating the transfer of a subset of a user's digital media content 212 to one or more target devices 104 from the media library 208 on source device 102. Examples of media content 212 in media library 208 may include audio, video, text, or image files. Media content 212 may also include a static or automated playlist of files (e.g., audio, video, and images) or any grouping of files or data. Some files in the media library 208 may be more or less important to the user than others, and the synch module 206 may assign a transfer priority to files in the library to indicate their relative importance or desirability to the user.

Components of the transcode architecture 210 interact with synch module 206 and other components of source device 102 to facilitate transcoding of media content 212 as a background process on source device 102 in anticipation of transferring transcoded media content 214 to one or more target devices 104. The transcode architecture 210 includes transcode manager 216, a transcode database 218, and a transcode cache 220 for storing transcoded media content 214.

Figures 5, 6, 7, 8:
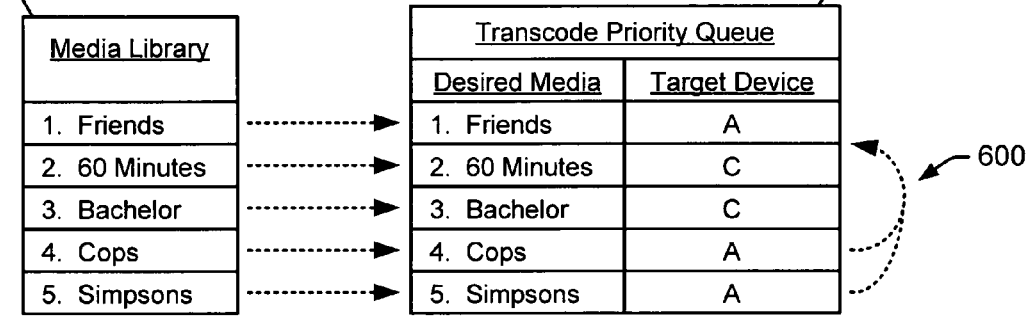

Transcode database 218 generally includes media status information regarding one or more potential target playback devices 104 and device capability information regarding the potential target devices 104. FIGS. 3-5 illustrate exemplary tables within transcode database 218 that show examples of the types of media status information and device capabilities information that may be stored in transcode database 218. In FIG. 3, for example, four potential target devices (A, B, C, and D) are shown, with additional details provided for target device A. For each potential target device, the example media status information in the transcode database tables includes a "Desired Media" data column, which indicates the media that a user desires to have transferred to the target device during the next synchronization process, a "Media In Media Library Yet?" data column, which indicates whether the desired media has been stored in the media library 208 yet, a "Media On Target Device Yet?" data column, which indicates whether the desired media has been transferred to the target device yet, and a "Media Transcoded Yet?" data column, which indicates whether the desired media has been transcoded and stored in the transcode cache 220. The transcode database 218 also includes information about the capabilities of each potential target device 104. The device capabilities information includes data such as the media file formats a device is capable of playing back (e.g., GIF, JPEG, MP3, WMA, AVI, WMV, etc.), the bit rate that the device is capable of handling, and the screen resolution the device has assuming the device is video capable. It is noted that the manner and extent of the media and capabilities information illustrated and discussed with respect to FIGS. 3-5 is intended as an example only, and is not intended as a limitation as to the manner and extent of any information that might be stored in the transcode database 218.

Transcode manager 216 monitors and updates transcode database 218 in order to control a transcoding process that runs in the background on source device 102 such that transcoded media content 214(A) is stored in transcode cache 220 and ready to be transferred to a target playback device 104 when the device is connected to source device 102. The synch module 206 updates the transcode database 218 with the desired media content for each target device 104 and with information about whether that content has been transferred and/or transferred to the device. The synch module 206 can also check the arrival of new media content 212 in the media library 208 against the desired media content for each target device 104, and determine whether the desired media has been transferred to the appropriate target playback device 104.

If desired media is available that has not been transferred to the appropriate target device 104, the transcode manager 216 determines from the transcode database 218 whether the desired media has been transcoded according to the device's capabilities and stored in the transcode cache 220. If there is media content 212 in the media library 208 that needs to be transcoded for a target playback device 104, transcode manager 216 determines the capabilities of the device from the transcode database 218, accesses the appropriate media content from the media library 208, transcodes the media content, and stores the transcoded media content 214(A) into the transcode cache 220. Upon the next connection of the appropriate target device 104, transcode manager 216 determines from the database that transcoded media content 214(A) is available to be transferred. Transcode manager 216 then notifies the synch module 206 that the transcoded media content 214(A) is available in the transcode cache 220 to be transferred to the target device. In another implementation, the transcode manager 216 itself transfers the transcoded media content 214(A) to the target playback device 104.

The process of transcoding media files is well-known and can include (depending on device capabilities), for example, converting a media file from one format to another (e.g., MP3 to WMA) so the file will play on the target playback device 104, down-sampling a media file to a lower bit rate for compatibility with the target device and to reduce the amount of storage space needed on the target device, and adapting the screen size of a video file so the video plays back correctly on the target playback device. Transcoding is often used to convert a media file to a format having lower CPU requirements for decoding, since "desktop" content may be too complex to decode effectively on a device with a lower-powered processor, such as a portable media playback device. Transcoding can also include various other processes for altering media files, and those mentioned herein are included by way of example only and not by way of limitation. Thus, other examples of transcoding include altering the word length of individual data samples (e.g. 24 bit to 16 bit), independently of the actual bit rate, altering the complexity profile of the encoder portion of the transcoding process to a more complex or more simple resultant file for purposes of managing CPU requirements at the destination device, and changing representative color spaces between the source and destination files as required by the target device (e.g. YUV to RGB, or vice versa).

An example of managing background transcoding processes through transcode database 218 can be demonstrated with reference to a "Target Device A" as shown in FIGS. 3-5. Within the columns of the example database tables of FIGS. 3-5, a check mark "√" is intended to provide an affirmative indication, while an "X" is intended to provide a negative indication. In FIG. 3, information in the 1$^{st}$ column labeled "Desired Media" indicates that a user desires that episodes of "Friends", "Cops", and the "Simpsons" be copied to Target Device A when the target device is connected to the source device 102. The desired media information in database 218 typically originates from user entries into source device 102 through an interface supported by various applications or tools, such as an interactive TV service media source application 202 that facilitates the recording of video (e.g., TV programming) directly off of a cable and/or satellite feed, a media player application 204, the synch module 206, and so on.

In FIG. 3, check marks in the $2^{nd}$ column labeled "Media In Media Library Yet?" indicate that media files for an episode of Friends and an episode of Cops (i.e., both from Desired Media column) have been stored in the media library 208. The "X" in the $2^{nd}$ column indicates that there is not a media file for the Simpsons in the media library 208. Likewise, "X"'s in the $3^{rd}$ column indicate that none of the desired media has been transferred yet to the target device, and "X"'s in the $4^{th}$ column indicate that none of the desired media has yet been transcoded and stored in the transcode cache 220.

When a desired media file is stored in the media library 208, such as with the media files for Friends and Cops as shown in FIG. 3, the transcode manager 216 begins transcoding the media file in anticipation of copying the transcoded media to the target device. In general, desired media files are transcoded in the order in which they become available in the media library 208. However, as discussed below, the transcoding priority can change.

Prior to transcoding a media file, the transcode manager 216 determines the target device capabilities from the transcode database 218 and transcodes the media file accordingly. As shown in the $5^{th}$ column of FIG. 3, the indicated device capabilities may include, for example, available file formats, bit rates, and screen resolution for the specified target device (i.e., Target Device A).

Thus, assuming in FIG. 3 that the Friends episode has been recorded in the media library 208 prior to the Cops episode, the transcode manager 216 begins transcoding the media file for the Friends episode, after which it transcodes the media file for the Cops episode. The transcode manager 216 stores the transcoded media files in the transcode cache 220 as transcoded media content 214(A) where it remains until it is transferred to the target device upon connection of the target device with the source device.

FIG. 4 illustrates a possible future state of the database table shown in FIG. 3. In FIG. 4, check marks in the $2^{nd}$ column indicate that all the desired media content identified in the $1^{st}$ column has been stored in the media library 208. Check marks in the $4^{th}$ column further indicate that this media content has already been transcoded and stored in the transcode cache 220 as transcoded media content 214(A). Upon connection of Target Device A 104 with source device 102, the transcode manager 216 checks the transcode database 218 and determines that the desired media content for Target Device A has already been transcoded and is stored in the transcode cache 220. The transcode manager 216 can then manage the copying of the transcoded media content 214(A) directly to the target playback device 104, or can notify another tool, such as the synch module 206, that the transcoded media content 214(A) is ready to be transferred to the target playback device 104.

FIG. 5 illustrates yet another possible future state of the database table shown in FIG. 3. In FIG. 5, check marks in the $2^{nd}$, $3^{rd}$, and $4^{th}$ columns indicate that the desired media identified in the $1^{st}$ column for Target Device A has been stored in the media library 208, and that it has already been transcoded and copied to Target Device A. After transcoded media content 214(A) in the transcode cache 220 has been transferred to the appropriate target playback device 104, transcode manager 216 typically deletes it from the cache. However, transcode manager 216 may first evaluate the transcode database 218 with respect to other target playback devices (e.g., Target Devices B, C, and D; FIG. 3) and determine if the transcoded media content is desired by any of these other devices. If so, the transcode manager 216 will retain the transcoded media content in the transcode cache until such time as it is copied to the other device or devices.

As mentioned above, desired media files are generally transcoded in the order in which they become available in the media library 208. However, the priority in which media files from the media library 208 are transcoded for target playback devices can change, especially where more than one target playback device 104 is involved. For example, FIG. 6 illustrates an example of media files that have been stored in the media library 208 in the order in which they were received into the media library. In this example, each of the media files is a desired media file with respect to one or more target playback devices 104.

Also shown in FIG. 6, is an example of a Transcode Priority Queue that may be a part of the transcode database 218. As the Transcode Priority Queue indicates, desired media files from the media library 208 are normally transcoded in the order in which they arrive in the media library 208. Thus, in the FIG. 6 scenario, the media file for the Friends episode would be transcoded first for target device A, the media file for the 60 Minutes episode would be transcoded second for the target device C, and so on, until the media file for the Simpsons episode is transcoded last for target device A. FIG. 7 illustrates an exemplary transcode timeline that shows this typical priority order of transcoding the media files shown in FIG. 6.

In certain circumstances, however, the typical priority order of transcoding can change. For example, referring again to FIG. 6, assume that the transcode manager 216 has already transcoded the media file for the Friends episode and is in the process of transcoding the media file for the 60 Minutes episode. Further assume that during the 60 Minutes transcode process, a user connects target playback device A to source device 102. In such a circumstance, it is clear that the user wants target playback device A synchronized with desired media content for that device. Therefore, transcode manager 216 is configured to adjust the transcode priority queue to accommodate the circumstance. In this case, transcode manager 216 interrupts the transcode process for the 60 Minutes episode and bumps up the transcode priority for all media files that are desired media files for target device A. Thus, as indicated by the arrows 600 of FIG. 6, the media files for the Cops episode and the Simpsons episode are bumped up in front of the 60 Minutes episode, and the transcode manager 216 immediately begins transcoding these media files.

FIG. 8 further illustrates this scenario with an exemplary transcode timeline. The transcode timeline of FIG. 8 shows that the Friends media file desired for target device A is transcoded first, after which the 60 Minutes episode desired for target device C begins the transcoding process. Part way through the 60 Minutes transcode, the transcode manager 216 interrupts the process and begins to transcode the remaining desired media files for target device A (i.e., the Cops episode and the Simpsons episode). The interrupt is indicated in FIG. 8 by the timeline break 800, and is initiated by a user connecting target device A to source device 102. After the transcode process is completed for desired media files indicated for target device A, the transcode manager 216 resumes the previously interrupted transcoding process for the 60 Minutes episode. The resumption of transcoding for the 60 Minutes episode is indicated in FIG. 8 by the timeline break 802.

Figure 9:
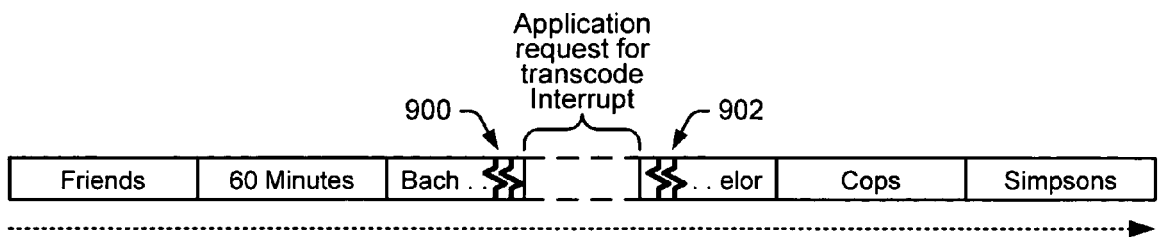
FIG. 9 illustrates an exemplary transcode timeline with an interrupted transcode priority.

In another circumstance, the transcode priority can be interrupted or throttled based on a request from an application. Because transcoding can be a processor intensive task, the transcode manager 216 enables applications to request that the transcode process be interrupted and/or throttled back in order that the processor is free to perform tasks associated with the requesting application. FIG. 9 illustrates an example transcode timeline where the general order of transcoding shown in FIG. 6 is proceeding, but is interrupted by an application request to discontinue the transcoding process. In FIG. 6, a media file for the Bachelor is being transcoded after media files for Friends and for 60 Minutes have already been transcoded. During the transcoding of the Bachelor media file, the transcode manager 216 interrupts the transcode process due to a request made by an application. Such a request might be to discontinue the transcoding until such time as a particular process related to executing the application has been completed. In FIG. 9, the timeline break 900 part way through the Bachelor indicates where the transcode manager 216 discontinues the transcoding process based on a request by an application, and the timeline break 902 indicates where the transcode manager 216 resumes the transcoding process once the application request has been honored.

Figure 10:
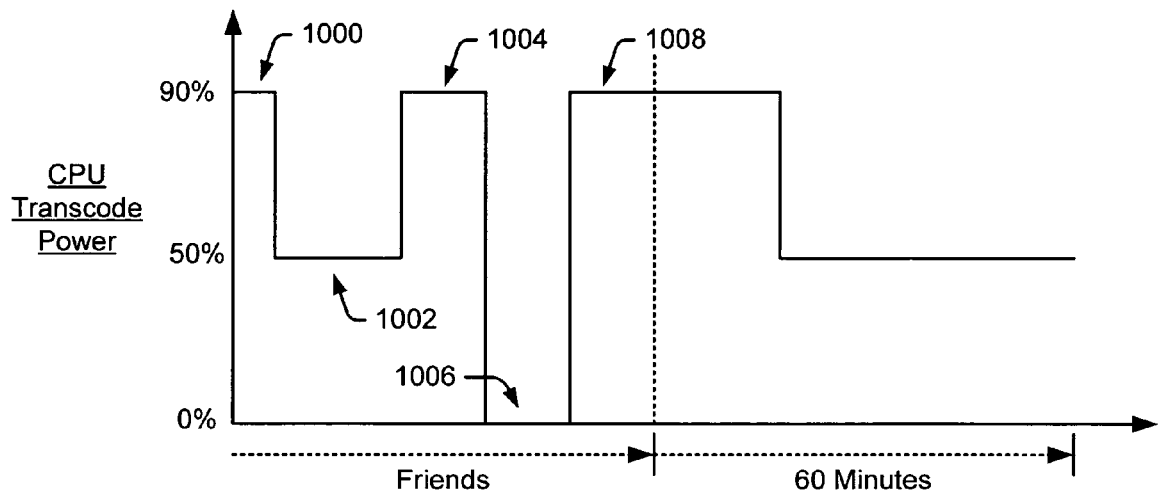
FIG. 10 illustrates an exemplary transcode process with throttling of processing power devoted to the transcode process.

FIG. 10 illustrates an example where an application request causes the transcode manager 216 to throttle back the CPU power being devoted to the transcoding process on the source device 102. Thus, a request from an application may indicate the amount of CPU power the application needs to execute, enabling the transcode manager 216 to determine how much to throttle back the CPU power being devoted to a transcoding process. In the FIG. 10 example, during a $1^{st}$ time period 1000, 90% of the CPU power is being devoted to transcoding a media file for a Friends TV episode. During a $2^{nd}$ time period 1002, the transcode manager 216 has throttled back the CPU power devoted to transcoding the Friends episode to 50% due to a request from an application. During a $3^{rd}$ time period 1004, the CPU power devoted to transcoding is throttled back up to 90%. During a $4^{th}$ time period 1006, the CPU power devoted to transcoding is throttled to 0% (i.e., transcoding is discontinued), and then during a $5^{th}$ time period 1008, the CPU power devoted to transcoding is throttled back up to 90%. It is noted that the description of throttling provided above with respect to FIG. 10 is intended as an example only and not as any limitation as to the nature, manner or amount of throttling capable by the transcode manager 216.

Exemplary Methods

Figure 11:
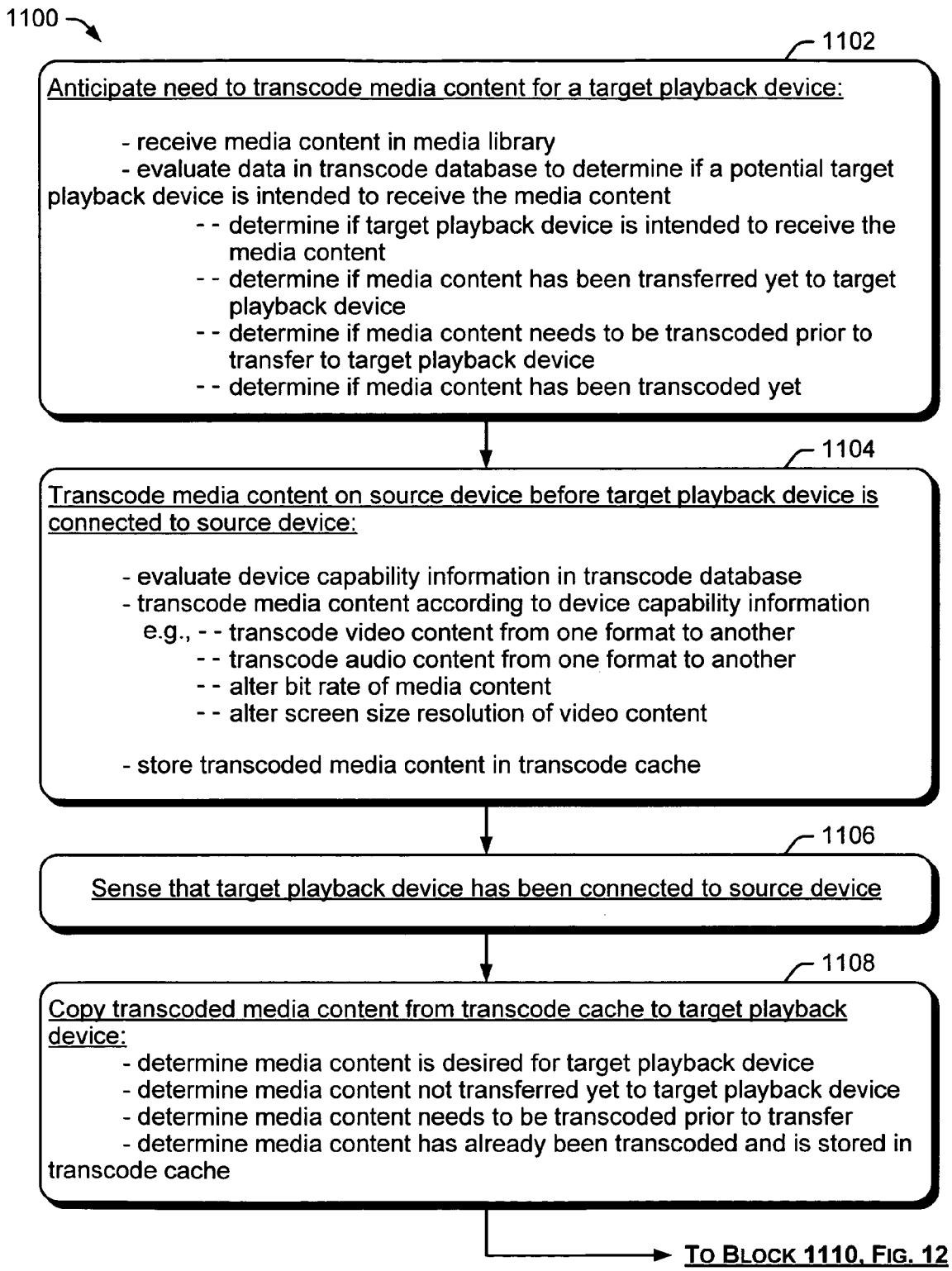
FIG. 11 is a flow diagram illustrating exemplary methods for background transcoding.

Example methods for background transcoding will now be described with primary reference to the flow diagrams of FIGS. 11 and 12. The methods apply to the exemplary embodiments discussed above with respect to FIGS. 1-10. While one or more methods are disclosed by means of flow diagrams and text associated with the blocks of the flow diagrams, it is to be understood that the elements of the described methods do not necessarily have to be performed in the order in which they are presented, and that alternative orders may result in similar advantages. Furthermore, the methods are not exclusive and can be performed alone or in combination with one another. The elements of the described methods may be performed by any appropriate means including, for example, by hardware logic blocks on an ASIC or by the execution of processor-readable instructions defined on a processor-readable medium.

A "processor-readable medium," as used herein, can be any means that can contain, store, communicate, propagate, or transport instructions for use or execution by a processor. A processor-readable medium can be, without limitation, an electronic, magnetic, optical, electromagnetic, infrared, or semiconductor system, apparatus, device, or propagation medium. More specific examples of a processor-readable medium include, among others, an electrical connection (electronic) having one or more wires, a portable computer diskette (magnetic), a random access memory (RAM) (magnetic), a read-only memory (ROM) (magnetic), an erasable programmable-read-only memory (EPROM or Flash memory), an optical fiber (optical), a rewritable compact disc (CD-RW) (optical), and a portable compact disc read-only memory (CDROM) (optical).

At block 1102 of method 1100, the need to transcode media content is anticipated. When media content arrives in a media library 208 on a source device 102, a transcode manager 216 evaluates information in a transcode database 218 regarding the status of media content for one or more target playback devices 104. The transcode manager determines from the database information whether the target playback device is intended to receive the media content, whether the media content has been transferred yet to target playback device, and whether the media content needs to be transcoded prior to transfer to the target playback device.

At block 1104, some or all of the media content is transcoded on the source device 102 before the target playback device 104 is connected to the source device. The transcoding can include typical transcoding tasks such as transcoding video media content from one format to another, transcoding audio media content from one format to another, altering the bit rate of media content, and altering the screen size resolution of video media content. The transcoding also includes evaluating device capability information in transcode database to determine the target playback device capabilities. The transcode manager 216 transcodes the media content according to the device capability information and stores the transcoded media content into a transcode cache 220.

At block 1106, a connection between the target playback device 104 and the source device 102 is sensed, and at block 1108, the transcoded media content is copied from the transcode cache 220 over to the target playback device 104. As part of the copying process, the transcode manager 216 determines that the target playback device is intended to receive the media content, that the media content has not yet been transferred to the target playback device, and that the media content has already been transcoded and is stored in the transcode cache.

Figure 12:
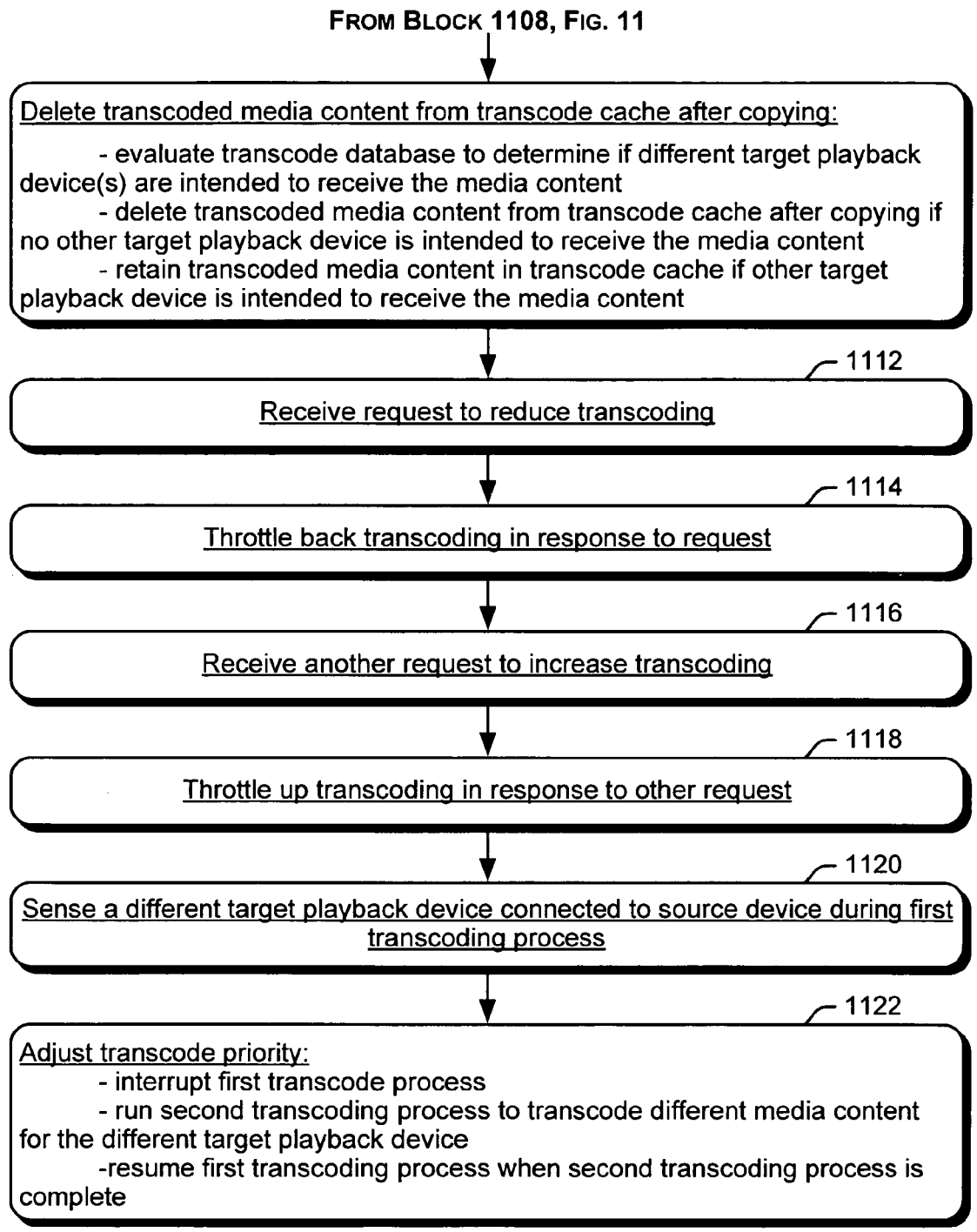
FIG. 12 is a continuation of the flow diagram of FIG. 11 illustrating exemplary methods for background transcoding.

The method 1100 continues at block 1110 of FIG. 12. At block 1110, the transcoded media content is deleted from the transcode cache after it is copied to the target playback device. Prior to deleting the transcoded media content, however, the transcode manager 216 evaluates the transcode database 218 to determine if other target playback devices are intended to receive the media content. If there are no other target playback devices intended to receive the media content, the transcoded media content is deleted from the cache. However, if there is another target playback device intended to receive the media content, the transcoded media content is retained in the cache until it is copied to the other target playback device.

At block 1112, a request is received to reduce the level of transcoding. The request is typically made by an application program that is indicating an amount of processing power it needs to perform some task. Thus, the request is to reduce the amount of processing power being devoted to the transcoding. At block 1114, the transcode manager 216 throttles back the level of transcoding in response to the request. The throttling back includes reducing the amount of processing power the source device 102 is devoting to the transcoding. At block 1116, another request is received to increase or resume the transcoding. The request is typically made as a result of the application program completing the task that caused the transcode manager to throttle back the transcoding. In response to the other request, the transcode manager increases or resumes the prior level of transcoding, as shown at block 1118.

At block 1120, during the first transcoding process, a connection to a different target device is sensed. The transcode manager 216 determines if there is media content intended for the different target device, and if so, adjusts the priority in which media content is being transcoded for target media devices, as shown at block 1122. Adjusting the transcode priority of media content can include interrupting the current/first transcoding process, initiating a second transcode process to transcode different media content for the different target playback device, and, after the second transcode process is completed, resuming the first transcode process. The interruption and resumption of the first transcode process is an adjustment to a normal transcode priority as generally discussed above with respect to FIGS. 6-8.

Exemplary Computing Environment

FIG. 13 illustrates an exemplary computing environment for implementing a source device 102 suitable for background transcoding such as discussed above with reference to FIGS. 1-12. Although one specific configuration is shown in FIG. 13, a source device 102 may also be implemented in other computing configurations.

The computing environment 1300 includes a general-purpose computing system in the form of a computer 1302. The components of computer 1302 may include, but are not limited to, one or more processors or processing units 1304, a system memory 1306, and a system bus 1308 that couples various system components including the processor 1304 to the system memory 1306.

The system bus 1308 represents one or more of any of several types of bus structures, including a memory bus or memory controller, a peripheral bus, an accelerated graphics port, and a processor or local bus using any of a variety of bus architectures. An example of a system bus 1308 would be a Peripheral Component Interconnects (PCI) bus, also known as a Mezzanine bus.

Computer 1302 includes a variety of computer-readable media. Such media can be any available media that is accessible by computer 1302 and includes both volatile and non-volatile media, removable and non-removable media. The system memory 1306 includes computer readable media in the form of volatile memory, such as random access memory (RAM) 1310, and/or non-volatile memory, such as read only memory (ROM) 1312. A basic input/output system (BIOS) 1314, containing the basic routines that help to transfer information between elements within computer 1302, such as during start-up, is stored in ROM 1312. RAM 1310 contains data and/or program modules that are immediately accessible to and/or presently operated on by the processing unit 1304.

Computer 1302 may also include other removable/non-removable, volatile/non-volatile computer storage media. By way of example, FIG. 13 illustrates a hard disk drive 1316 for reading from and writing to a non-removable, non-volatile magnetic media (not shown), a magnetic disk drive 1318 for reading from and writing to a removable, non-volatile magnetic disk 1320 (e.g., a "floppy disk"), and an optical disk drive 1322 for reading from and/or writing to a removable, non-volatile optical disk 1324 such as a CD-ROM, DVD-ROM, or other optical media. The hard disk drive 1316, magnetic disk drive 1318, and optical disk drive 1322 are each connected to the system bus 1308 by one or more data media interfaces 1325. Alternatively, the hard disk drive 1316, magnetic disk drive 1318, and optical disk drive 1322 may be connected to the system bus 1308 by a SCSI interface (not shown).

The disk drives and their associated computer-readable media provide non-volatile storage of computer readable instructions, data structures, program modules, and other data for computer 1302. Although the example illustrates a hard disk 1316, a removable magnetic disk 1320, and a removable optical disk 1324, it is to be appreciated that other types of computer readable media which can store data that is accessible by a computer, such as magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like, can also be utilized to implement the exemplary computing system and environment.

Any number of program modules can be stored on the hard disk 1316, magnetic disk 1320, optical disk 1324, ROM 1312, and/or RAM 1310, including by way of example, an operating system 1326, one or more application programs 1328, other program modules 1330, and program data 1332. Each of such operating system 1326, one or more application programs 1328, other program modules 1330, and program data 1332 (or some combination thereof) may include an embodiment of a caching scheme for user network access information.

Computer 1302 can include a variety of computer/processor readable media identified as communication media. Communication media embodies computer readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above are also included within the scope of computer readable media.

A user can enter commands and information into computer system 1302 via input devices such as a keyboard 1334 and a pointing device 1336 (e.g., a "mouse"). Other input devices 1338 (not shown specifically) may include a microphone, joystick, game pad, satellite dish, serial port, scanner, and/or the like. These and other input devices are connected to the processing unit 1304 via input/output interfaces 1340 that are coupled to the system bus 1308, but may be connected by other interface and bus structures, such as a parallel port, game port, or a universal serial bus (USB).

A monitor 1342 or other type of display device may also be connected to the system bus 1308 via an interface, such as a video adapter 1344. In addition to the monitor 1342, other output peripheral devices may include components such as speakers (not shown) and a printer 1346 which can be connected to computer 1302 via the input/output interfaces 1340.

Computer 1302 may operate in a networked environment using logical connections to one or more remote computers, such as a remote computing device 1348. By way of example, the remote computing device 1348 can be a personal computer, portable computer, a server, a router, a network computer, a peer device or other common network node, and the like. The remote computing device 1348 is illustrated as a portable computer that may include many or all of the elements and features described herein relative to computer system 1302.

Logical connections between computer 1302 and the remote computer 1348 are depicted as a local area network (LAN) 1350 and a general wide area network (WAN) 1352.

Such networking environments are commonplace in offices, enterprise-wide computer networks, intranets, and the Internet. When implemented in a LAN networking environment, the computer 1302 is connected to a local network 1350 via a network interface or adapter 1354. When implemented in a WAN networking environment, the computer 1302 includes a modem 1356 or other means for establishing communications over the wide network 1352. The modem 1356, which can be internal or external to computer 1302, can be connected to the system bus 1308 via the input/output interfaces 1340 or other appropriate mechanisms. It is to be appreciated that the illustrated network connections are exemplary and that other means of establishing communication link(s) between the computers 1302 and 1348 can be employed.

In a networked environment, such as that illustrated with computing environment 1300, program modules depicted relative to the computer 1302, or portions thereof, may be stored in a remote memory storage device. By way of example, remote application programs 1358 reside on a memory device of remote computer 1348. For purposes of illustration, application programs and other executable program components, such as the operating system, are illustrated herein as discrete blocks, although it is recognized that such programs and components reside at various times in different storage components of the computer system 1302, and are executed by the data processor(s) of the computer.

CONCLUSION

Although the invention has been described in language specific to structural features and/or methodological acts, it is to be understood that the invention defined in the appended claims is not necessarily limited to the specific features or acts described. Rather, the specific features and acts are disclosed as exemplary forms of implementing the claimed invention.

The invention claimed is:

1. A computer implemented method comprising:
    maintaining, by a source device, in a transcode database, media status information that identifies:
        media content to be synchronized to a target playback device during a next connection between the source device and the media playback device; and
        device capability information regarding the target playback device;
    while the target playback device is not connected to the source device, according to the media status information, anticipating, by the source device, a need to transcode media content for future download to the target playback device;
    in response to the anticipating, the source device transcoding the media content on the source device before the target playback device is connected to the source device, wherein the transcoding comprises:
        evaluating, by the source device, the device capability information stored in the transcode database to determine a media file format that the target playback device is capable of playing back;
        transcoding the media content according to the device capability information, to generate transcoded media content in the media file format that the target playback device is capable of playing back; and
        storing the transcoded media content in a transcode cache; and
    while the target device is connected to the source device, according to the media status information, determining, by the source device, which media content is to be copied to the target playback device and whether or not the media content has been transcoded and stored in the transcode cache;
        in an event that the media content has been transcoded and stored in the transcode cache, immediately transferring, by the source device, the media content to the target playback device;
        in an event that the media content has not been transcoded and stored in the transcode cache, prioritizing, by the source device, a task of transcoding the media content to be copied to the target playback device above other transcoding tasks,
    wherein:
        the source device is implemented as a personal computer;
        the target playback device is implemented as a portable media player;
        the media status information includes rules set up by a user to indicate which media content on the source device to be copied to the target playback device, the rules being entered by the user through a media player application on the source device; and
        the media status information is maintained in the transcode database, located at the source device, while the target playback device is not connected to the source device.

2. A method as recited in claim 1, wherein the anticipating comprises:
    receiving, by the source device, the media content in a media library, and
    in response to the receiving, evaluating, by the source device, data stored in the transcode database to determine if one or more potential target playback devices is intended to receive the media content.

3. A method as recited in claim 2, wherein the evaluating comprises:
    determining, by the source device, that the target playback device is intended to receive the media content;
    determining, by the source device, that the media content has not yet been transferred to the target playback device;
    determining, by the source device, that the media content needs to be transcoded prior to being transferred to the target playback device; and
    determining, by the source device, that the media content has not yet been transcoded.

4. A method as recited in claim 1, wherein the transcoding is selected from a group consisting of:
    transcoding, by the source device, video content from one format to another format;
    transcoding, by the source device, audio content from one format to another format;
    altering, by the source device, the bit rate of the media content;
    altering, by the source device, screen size resolution of video content;
    altering, by the source device, a word length of an individual data samples independently of bit rate;
    altering, by the source device, a complexity profile of an encoder portion of a transcoding process to manage processing requirements at the target playback device; and
    changing, by the source device, representative color spaces between a source file and a destination files as required by the target playback device.

5. A method as recited in claim 1, further comprising:
sensing, by the source device, that the target playback device has been connected to the source device; and
copying, by the source device, the transcoded media content from a transcode cache on the source device to the target playback device.

6. A method as recited in claim 5, wherein the copying comprises:
determining, by the source device, that the media content is desired content for the target playback device;
determining, by the source device, that the media content has not yet been transferred to the target playback device;
determining, by the source device, that the media content needs to be transcoded prior to being transferred to the target playback device; and
determining, by the source device, that the media content has already been transcoded and is stored in the transcode cache.

7. A method as recited in claim 5, further comprising deleting, by the source device, the transcoded media content from the transcode cache after the copying.

8. A method as recited in claim 5, further comprising:
evaluating, by the source device, data stored in a transcode database to determine if a different target playback device is intended to receive the media content; and
if there is not a different target playback device intended to receive the media content, deleting, by the source device, the transcoded media content from the transcode cache after the copying.

9. A method as recited in claim 1, wherein the transcoding is a first transcoding process, the method further comprising:
sensing, by the source device, that a different target playback device is connected to the source device during the first transcoding process; and
adjusting, by the source device, a transcode priority to accommodate the different target playback device.

10. A method as recited in claim 9, wherein the adjusting a transcode priority comprises:
interrupting, by the source device, the first transcoding process;
running, by the source device, a second transcoding process to transcode different media content for the different target playback device; and
resuming, by the source device, the first transcoding process when the second transcoding process is complete.

11. A method as recited in claim 10, further comprising copying, by the source device, transcoded different media content to the different target playback device after the second transcoding process is complete.

12. A method as recited in claim 1, further comprising:
receiving, by the source device, a request to reduce resources consumed by the transcoding; and
throttling back, by the source device, the transcoding in response to the request.

13. A method as recited in claim 12, further comprising:
receiving, by the source device, another request to increase the resources consumed by the transcoding; and
throttling up, by the source device, the transcoding in response to the other request.

14. A method as recited in claim 12, wherein the receiving a request comprises receiving, by the source device, a request from an application program for a level of processing power.

15. A method as recited in claim 12, wherein the request to reduce the transcoding is a request to stop the transcoding and the throttling back the transcoding comprises stopping, by the source device, the transcoding.

16. A method as recited in claim 14, wherein the throttling back the transcoding comprises reducing, by the source device, processing power devoted to the transcoding.

17. A computer-readable storage medium encoded with processor-executable instructions that, when executed on a processor, direct a computing system to perform a method, the method comprising:
receiving, by the computing system, media status information that identifies user-specified media content to be synchronized to a target playback device, wherein the media status information is received while the target playback device is not connected to the computing system;
maintaining, by the computing system, in a transcode database, the media status information;
receiving, by the computing system, the media content;
determining, by the computing system, that the target playback device is intended to be synchronized with the media content;
generating, by the computing system, transcoded media content by transcoding the media content for the target playback device before the target playback device is connected to be synchronized;
while the target device is connected to the computing system, according to the media status information, determining, by the computing system, which media content is to be copied to the target playback device and whether or not the media content has been transcoded and stored in a transcode cache;
in an event that the media content has been transcoded and stored in the transcode cache, immediately transferring, by the computing system, the media content to the target playback device;
in an event that the media content has not been transcoded and stored in the transcode cache, prioritizing, by the computing system, a task of transcoding the media content to be copied to the target playback device above other transcoding tasks;
determining, by the computing system, if another target playback device is intended to be synchronized with the media content, according to media status information maintained in the transcode database;
deleting, by the computing system, the transcoded media content from a transcode cache if it is determined that another target playback device is not intended to be synchronized with the media content; and
retaining, by the computing system, the transcoded media content in the transcode cache if another target playback device is intended to be synchronized with the media content.

18. A computer storage medium as recited in claim 17, further comprising storing the transcoded media content in a transcode cache.

19. A computer storage medium as recited in claim 18, wherein the method further comprises:
sensing that the target playback device is connected for synchronization; and
copying the transcoded media content from the transcode cache to the target playback device.

20. A computer storage medium as recited in claim 17, wherein the transcoding comprises:
determining device capabilities of the target playback device; and
transcoding the media content in accordance with the device capabilities.

21. A computer storage medium as recited in claim 17, wherein the method further comprises:

receiving an transcode interrupt request during the transcoding; and stopping the transcoding of the media content for the target playback device in response to the request.

22. A computer storage medium as recited in claim 21, wherein the method further comprises:

transcoding different media content for a different target playback device; and resuming the transcoding of the media content for the target playback device after the transcoding different media content for the different target playback device is completed.

23. A computer storage medium as recited in claim 17, wherein the method further comprises:

receiving an transcode reduction request during the transcoding; and reducing processor power devoted to the transcoding.

24. A computer storage medium as recited in claim 23, wherein the method further comprises:

receiving an transcode increase request during the transcoding; and increasing processor power devoted to the transcoding.

25. A computer comprising the computer storage medium of claim 17.

26. A computer system comprising:

memory and a processor;

a media library module, stored in the memory and executable on the processor, configured to store media content; and a transcode architecture module, stored in the memory and executable on the processor, configured to pre-transcode at least a portion of the media content in anticipation of a connection between a portable playback device and the computer system, the transcode architecture module comprising:

a transcode cache;

a transcode database comprising media status information that indicates:

user-specified media that the user desires to synchronize to the portable playback device during a next connection, wherein the media status information is received while the portable playback device is not connected to the computer; and device capability information regarding media formats supported by the portable playback device;

and a transcode manager configured to:

determine, from the device capability information stored in the transcode database, one or more media file formats that the portable playback device is capable of playing back;

transcode media content according to the one or more media file formats the portable playback device is capable of playing back;

store transcoded media content in the transcode; and while the target device is connected to the computing system, according to the media status information, determine, by the computing system, which media content is to be copied to the target playback device and whether or not the media content has been transcoded and stored in the transcode cache;

in an event that the media content has been transcoded and stored in the transcode cache, immediately transferring, by the computing system, the media content to the target playback device; and in an event that the media content has not been transcoded and stored in the transcode cache, prioritizing, by the computing system, a task of transcoding the media content to be copied to the target playback device above other transcoding tasks.

27. A computer as recited in claim 26, wherein the transcode database includes media status information for one or more portable playback devices.

28. A computer as recited in claim 26, further comprising a synchronization module configured to provide information to the transcode database indicating media content desired for the portable playback device.

29. A computer as recited in claim 26, further comprising a media source application configured to provide media content to the media library.

* * * * *